United States Patent
Ennis et al.

(10) Patent No.: US 11,808,015 B2
(45) Date of Patent: *Nov. 7, 2023

(54) TRACKING ROTATION WITH A SWING SENSOR

(71) Applicant: Caterpillar Trimble Control Technologies LLC, Dayton, OH (US)

(72) Inventors: Nathan Ennis, Washington, IL (US); Christopher Corwin, East Peoria, IL (US)

(73) Assignee: Caterpillar Trimble Control Technologies LLC, Dayton, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/093,738

(22) Filed: Jan. 5, 2023

(65) Prior Publication Data

US 2023/0151587 A1 May 18, 2023

Related U.S. Application Data

(63) Continuation of application No. 16/688,635, filed on Nov. 19, 2019, now Pat. No. 11,549,240.

(51) Int. Cl.
*E02F 9/26* (2006.01)
*E02F 3/43* (2006.01)
*G01S 19/26* (2010.01)

(52) U.S. Cl.
CPC .............. *E02F 9/264* (2013.01); *E02F 3/435* (2013.01); *G01S 19/26* (2013.01)

(58) Field of Classification Search
CPC ............ E02F 9/264; E02F 3/435; G01S 19/26

USPC .......................................................... 37/443
See application file for complete search history.

(56) References Cited

U.S. PATENT DOCUMENTS

| | | | |
|---|---|---|---|
| 9,943,022 B1* | 4/2018 | Alam | G01S 19/41 |
| 11,549,240 B2 | 1/2023 | Ennis et al. | |
| 2012/0059554 A1 | 3/2012 | Omelchenko et al. | |
| 2019/0345696 A1 | 11/2019 | Hansby et al. | |

(Continued)

FOREIGN PATENT DOCUMENTS

WO 2016/164975 A1 10/2016

OTHER PUBLICATIONS

International Search Report and Written Opinion for Application No. PCT/US2020/059854, dated Feb. 25, 2021, 14 pages.

(Continued)

*Primary Examiner* — Aditya S Bhat
(74) *Attorney, Agent, or Firm* — KILPATRICK TOWNSEND & STOCKTON LLP

(57) ABSTRACT

Systems and methods for tracking a heading of an excavator are provided. An initial heading of the excavator platform is obtained and a current azimuthal orientation of the excavator platform is associated with the initial heading. Coordinates of a measurement center of the GNSS device are obtained. Coordinates of a center of rotation of the excavator platform are determined using the initial heading of the excavator platform, the coordinates of the measurement center, and a known spatial relationship between the measurement center of the GNSS device and the center of rotation of the excavator platform. Rotation of the excavator platform is tracked from the initial heading to a first heading using rotation measurements from a swing sensor.

20 Claims, 5 Drawing Sheets

(56) References Cited

U.S. PATENT DOCUMENTS

2021/0293972 A1    9/2021   Tamazato

OTHER PUBLICATIONS

U.S. Appl. No. 16/688,635 Non-Final Office Action dated May 24, 2022, 11 pages.
U.S. Appl. No. 16/688,635 Notice of Allowance dated Sep. 14, 2022, 7 pages.

* cited by examiner

TRACKING ROTATION WITH A SWING SENSOR

CROSS REFERENCE TO RELATED APPLICATIONS

The present application is a Continuation of U.S. application Ser. No. 16/688,635, filed Nov. 19, 2019, the contents of which are incorporated herein by reference in their entirety for all purposes.

FIELD

Embodiments described herein relate generally to tracking rotation with a swing sensor, and more particularly to using rotation measurements from the swing sensor to determine coordinates of a center of rotation of a rotating platform such as an excavator platform of an excavator. The determined coordinates may be used, for example, to estimate a location of a bucket tip during excavation processes.

BACKGROUND

It is often useful to track rotation of platforms such as excavator platforms. As used herein, an excavator refers broadly to any type of construction equipment that includes a rotating platform. The rotating platform generally sits atop an undercarriage that includes tracks or wheels. Some types of construction equipment include a bucket or other implement that is coupled to the rotating platform by an arm (e.g., boom and/or stick). Rotation measurements can be used to determine coordinates of a center of rotation of the rotating platform, which can be used to determine a location of the bucket or other implement in space. This information is useful, for example, during digging processes.

A conventional technique for determining coordinates of a center of rotation includes capturing a number of position measurements during rotation of a platform and fitting an arc to the measurements. This technique often requires the platform to rotate by up to 100° or more to provide a good curve for fitting. As an example, assuming a position measurement rate of 10 Hz, a swing of approximately 100° over a 4 second time period provides 40 data points for the curve fitting. When the platform is moved from one location to another, an initialization process requiring large rotations must be repeated to determine the coordinates of the center of rotation at the new location.

In light of the above, improved methods for determining coordinates of a center of rotation of a rotating platform are desired.

SUMMARY

Embodiments described herein provide improved systems and methods for tracking rotation of a platform and/or determining coordinates of a center of rotation of the platform. As used herein, rotation of the platform is about a vertical axis of rotation, and the center of rotation of the platform is at an intersection of the vertical axis of rotation and horizontal axes of rotation.

A swing sensor is coupled to the excavator and configured to measure rotation of the excavator platform about the vertical axis of rotation. The vertical axis is aligned with the center of rotation. Rotation measurements from the swing sensor and position measurements from a single Global Navigation Satellite System (GNSS) device may be used to determine the coordinates of the center of rotation of the platform. While a GNSS device will be referred to herein, it should be appreciated that other measurement devices providing the same or similar position information may also be used with the described embodiments.

In accordance with a particular embodiment, a system for tracking a heading of an excavator includes an excavator platform coupled to an undercarriage of the excavator along a vertical axis aligned with a center of rotation of the excavator platform. The excavator platform is configured to rotate around the vertical axis and the undercarriage is configured to support the excavator platform and provide translational movement of the excavator platform. A single GNSS device is coupled to the excavator platform that has a measurement center located away from the vertical axis aligned with the center of rotation of the excavator platform. The measurement center is arranged in a known spatial relationship with the center of rotation of the excavator platform. The GNSS device is configured to determine coordinates of the measurement center in a real-world coordinate frame. A swing sensor is coupled to the excavator and configured to measure rotation of the excavator platform about the vertical axis aligned with the center of rotation. A controller is communicatively coupled to the GNSS device and the swing sensor. The controller is configured to obtain an initial heading of the excavator platform and associate a current azimuthal orientation of the excavator platform with the initial heading, obtain the coordinates of the measurement center from the GNSS device, and determine coordinates of the center of rotation of the excavator platform using the initial heading of the excavator platform, the coordinates of the measurement center, and the known spatial relationship between the measurement center of the GNSS device and the center of rotation of the excavator platform. The controller is also configured to track rotation of the excavator platform from the initial heading to a first heading using rotation measurements from the swing sensor.

In an embodiment, the swing sensor is coupled to the excavator platform or the undercarriage at a location proximate to a point of rotation between the excavator platform and the undercarriage.

In another embodiment, the controller is configured to obtain the initial heading of the excavator platform by obtaining a plurality of coordinates of the measurement center of the GNSS device while rotating the excavator platform, and determine the initial heading of the excavator platform using the plurality of coordinates.

In another embodiment, the controller is further configured to track translational movement of the excavator during tramming using coordinate measurements from the GNSS device, and the controller is also configured to track rotation of the excavator platform during tramming using rotation measurements from the swing sensor.

In another embodiment, the controller is further configured determine second coordinates of the center of rotation of the excavator platform after tramming the excavator from a first location to a second location and after rotating the excavator platform from the first heading to a second heading. The second coordinates of the center of rotation are determined using coordinate measurements of the GNSS device at the second location and rotation measurements from the swing sensor during the rotation from the first heading to the second heading.

In another embodiment, the excavator platform is coupled to an arm of the excavator that includes an implement, and the controller is further configured to determine coordinates of a working edge of the implement in the real-world coordinate frame using the coordinates of the center of the rotation of the excavator platform.

In yet another embodiment, the swing sensor is configured to measure the rotation of the excavator platform by measuring an angular displacement of the excavator platform about the vertical axis aligned with the center of rotation.

In accordance with another embodiment, a method for tracking a heading of an excavator using a single GNSS device and a swing sensor includes obtaining an initial heading of an excavator platform of the excavator and associating a current azimuthal orientation of the excavator platform with the initial heading. First coordinates of a measurement center of the GNSS device are obtained. The measurement center of the GNSS device is located away from a vertical axis aligned with a center of rotation of the excavator platform, and the measurement center of the GNSS device is arranged in a known spatial relationship with the center of rotation of the excavator platform. First coordinates of the center of rotation of the excavator platform are determined using the initial heading of the excavator platform, the first coordinates of the measurement center of the GNSS device, and the known spatial relationship between the measurement center of the GNSS device and the center of rotation of the excavator platform. Rotation of the excavator platform is tracked from the initial heading to a first heading using rotation measurements from the swing sensor. The swing sensor is located proximate to a point of rotation between the excavator platform and an undercarriage of the excavator, and the swing sensor is configured to measure rotation of the excavator platform about a vertical axis aligned with the center of rotation. The excavator is trammed from a first location to a second location, and while tramming the excavator, translational movement of the excavator is tracked using position measurements from the GNSS device, and rotation of the excavator platform is tracked from the first heading to a second heading using rotation measurements from the swing sensor. After tramming the excavator, second coordinates of the measurement center of the GNSS device are obtained, and second coordinates of the center of rotation of the excavator platform are determined using the second heading, the second coordinates of the measurement center of the GNSS device, and the known spatial relationship between the measurement center of the GNSS device and the center of rotation of the excavator platform.

In an embodiment, obtaining the initial heading of the excavator platform includes obtaining a plurality of coordinates of the measurement center of the GNSS device while translating the excavator, and determining the initial heading of the excavator platform using the plurality of coordinates.

In another embodiment, the method also includes, after tramming the excavator, tracking rotation of the excavator platform from the second heading to a third heading using only rotation measurements from the swing sensor and without obtaining heading information from sources other than the swing sensor and without performing a heading initialization procedure after the tramming.

In another embodiment, the initial heading of the excavator platform is provided in a real-world coordinate frame, and the second location of the excavator is determined in the real-world coordinate frame.

In another embodiment, the known spatial relationship between the measurement center of the GNSS device and the center of rotation of the excavator platform comprises a distance between the measurement center of the GNSS device and the center of rotation along at least one axis in a coordinate frame of the excavator platform.

In yet another embodiment, the excavator platform is coupled to an arm of the excavator that includes an implement, and the method also includes determining coordinates of a working edge of the implement in a real-world coordinate frame using the coordinates of the center of the rotation of the excavator platform.

In accordance with yet another embodiment, a method for tracking a heading of an excavator using a GNSS device and a swing sensor includes obtaining a first heading of an excavator platform of the excavator and associating a current azimuthal orientation of the excavator platform with the first heading, and obtaining first coordinates of a measurement center of the GNSS device. The measurement center of the GNSS device is located away from a vertical axis aligned with a center of rotation of the excavator platform, and the measurement center of the GNSS device is arranged in a known spatial relationship with the center of rotation of the excavator platform. First coordinates of the center of rotation of the excavator platform are determined using the first heading of the excavator platform, the first coordinates of the measurement center of the GNSS device, and the known spatial relationship between the measurement center of the GNSS device and the center of rotation of the excavator platform. The excavator is trammed from a first location to a second location, and while tramming the excavator, translational movement of the excavator is tracked using the GNSS device, and rotation of the excavator platform is tracked from the first heading to a second heading using rotation measurements from the swing sensor. The swing sensor is configured to measure rotation of the excavator platform about a vertical axis aligned with the center of rotation. After tramming the excavator, second coordinates of the measurement center of the GNSS device, and second coordinates of the center of rotation of the excavator platform are determined using the second heading of the excavator platform, the second coordinates of the measurement center of the GNSS device, and the known spatial relationship between the measurement center of the GNSS device and the center of rotation of the excavator platform.

Numerous benefits are achieved using embodiments described herein over conventional techniques. For example, some embodiments enable rotation to be measured directly rather than calculated based on other sensor measurements. This can improve accuracy and eliminate drift in rotation information. In some embodiment, rotation can be tracked during and after tramming without obtaining heading information from sources other than the swing sensor and without performing a heading initialization procedure after the tramming. In excavator applications, this can improve efficiency as multiple separate heading initialization steps are not required. These and other benefits are described throughout the specification with reference to the appended drawings.

DETAILED DESCRIPTION

Embodiments described herein provide improved systems and methods for tracking rotation of a platform using a swing sensor and/or for determining coordinates of a center of rotation of the platform. Rotation measurements provided by the swing sensor may be used to track rotation of the platform before, during, and after translational movement of the platform. The rotation measurements can be used with position measurements to determine coordinates of the center of rotation.

A real-world example of a platform that will be used throughout this application is an excavator that has a rotating excavator platform coupled to an undercarriage that includes movable tracks or wheels. It should be appreciated that an excavator is used herein merely as an example, and the embodiments described may be used with any other equipment, vehicles, machinery, or devices that includes a rotating platform coupled to an undercarriage. When used with an excavator, the information obtained may be used in accordance with known techniques to determine a location of a bucket or implement in a real-world coordinate frame.

Figure 1:
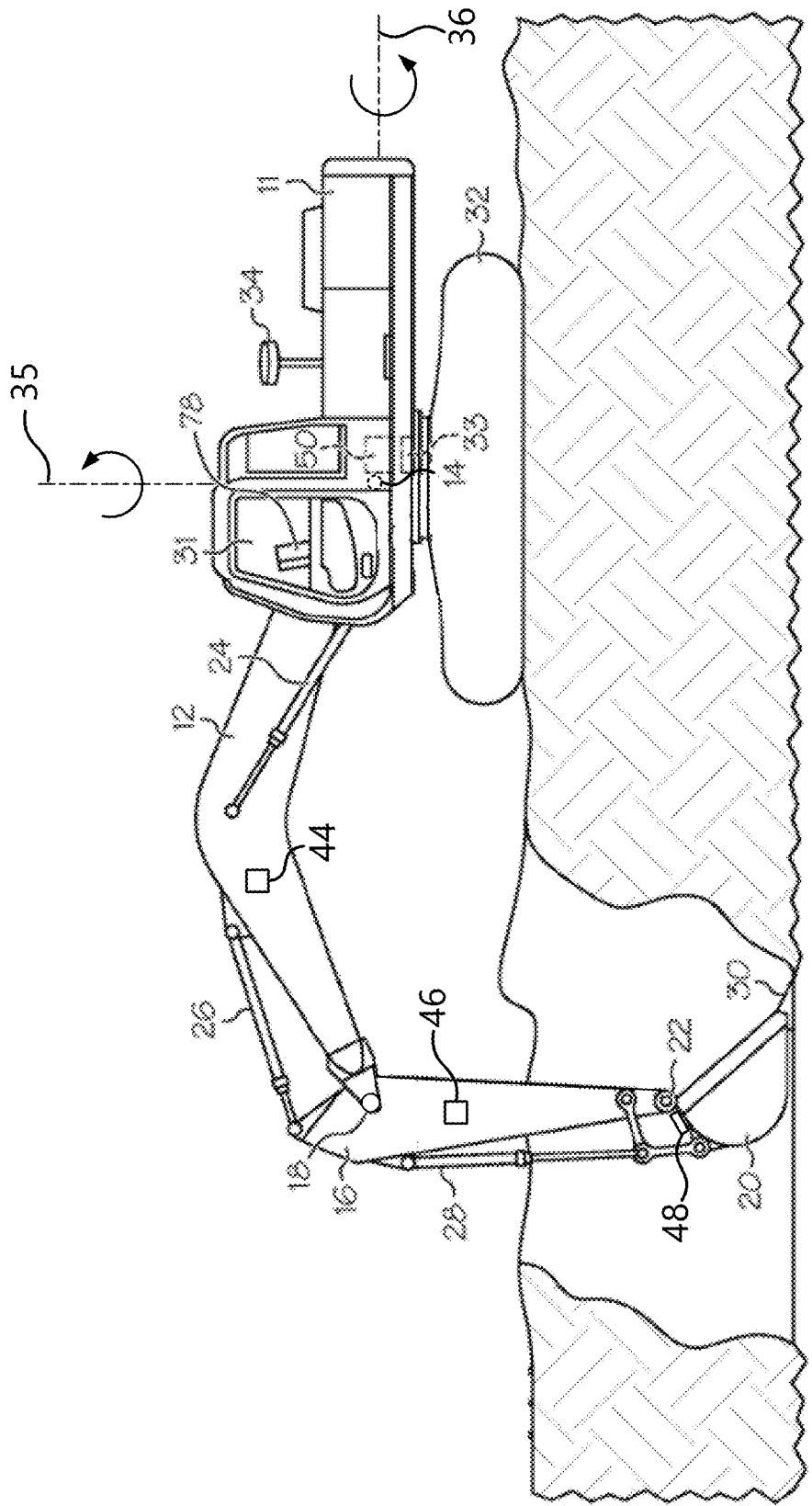
FIG. 1 is a simplified side view of an excavator that may be used with some of the embodiments described herein.

FIG. 1 is a simplified side view of an excavator that may be used with some of the embodiments described herein. The excavator includes a excavator platform 11 and an undercarriage 32. The excavator platform 11 is configured to rotate around a vertical axis of rotation 35 using a hydraulic motor or by other means. The vertical axis of rotation 35 is aligned with a center of rotation 14 of the excavator platform 11. The center of rotation 14 is at an intersection of the vertical axis of rotation 35, a horizontal axis of rotation 36, and a horizontal axis of rotation extending orthogonal to the drawing in FIG. 1. The center of rotation 14 is a point of origin for tracking location of a working edge of an implement such as teeth 30 of bucket 20. It should be appreciated that the excavator can be used with other implements or tools besides the bucket 20 such as augers, trenchers, compactors, and the like.

The undercarriage 32 is configured to support the excavator platform 11, and in this example, includes tracks that provide translational movement of the excavator platform 11. The excavator platform 11 is coupled to the undercarriage 32 at a point of rotation between the excavator platform 11 and the undercarriage 32. As an example, the excavator platform 11 may be coupled to the undercarriage 32 by a rotary union that provides 360° rotation about the vertical axis of rotation 35.

The excavator in this example also includes a boom 12, a stick 16, and the bucket 20. The boom 12 is pivotally coupled to the platform 11 at a pivot point (not shown), the stick 16 is pivotally coupled to the boom 12 at a pivot point 18, and the bucket 20 is pivotally coupled to the stick 16 at a pivot point 22. Hydraulic devices 24, 26, 28 are provided to move the boom 12, the stick 16, and the bucket 20.

Excavators commonly utilize a variety of sensors to monitor positions of various machine elements and/or to provide a display of element positions to an operator. The excavator in this example also includes a swing sensor 33. The swing sensor 33 is configured to measure rotation of the excavator platform 11 about the vertical axis of rotation 35. The swing sensor 33 may measure rotation of the excavator platform 11 by measuring an angular displacement of the excavator platform 11 about the vertical axis of rotation 35. The swing sensor 33 may be located at or proximate to a point of rotation between the excavator platform 11 and the undercarriage 32. The swing sensor 33 may be any type of sensor that provides direct measurement of the rotation. Examples include optical sensors and magnetic sensors such as Hall effect sensors.

The excavator also includes a single GNSS device 34. The GNSS device 34 is disposed on the platform 11 at a location that is separate and away from the center of rotation 14 so that a measured position of the GNSS device 34 changes as the platform 11 is rotated. The GNSS device 34 is arranged in a known spatial relationship with the center of rotation 14. For example, the GNSS device 34 may be arranged at a known location in a coordinate frame of the platform 11.

It should be appreciated that an antenna of the GNSS device 34 may be located separate from a receiver of the GNSS device 34. When the GNSS device 34 is described as being disposed at a location that is away from the center of rotation 14, it is at least a phase center (or measurement center) of the antenna that is located away from the center of rotation 14. Thus, regardless of a location of the receiver, position measurements by the GNSS device 34 change as the platform 11 is rotated. This is in contrast to the position of the center of rotation 14 that may not change when the only movement is rotation.

The GNSS device 34 is configured in accordance with known techniques to use satellite signals to determine position information. The GNSS device 34 may be part of any satellite positioning system such as the Global Positioning System (GPS), Global Navigation Satellite System (GLONASS), Galileo, BeiDou Navigation Satellite System (BDS), or the like.

The excavator also includes sensors to monitor positions of various machine elements such as the boom 12, the stick 16, and the bucket 20. For example, angles of these elements can be determined relative to gravity using inclinometers such as inertial measurement units (IMUs). In the example of FIG. 1, the excavator includes an IMU 44 on the boom 12, an IMU 46 on the stick 16, and an IMU 48 on the bucket 20. These IMUs 44, 46, 48 can be used to determine angles of the bodies 12, 16, 20 relative to gravity. Along with a heading of the excavator platform 11 and a location of the center of rotation 14 in a real-world coordinate frame, the IMU's 44, 46, 48 can be used to determine a location of the teeth 30 of the bucket 20 in the real-world coordinate frame. As used herein, the real-world coordinate frame is one that is based on references that are external to and independent of the excavator.

The excavator in this example also includes a controller 50 that may include one or more processors, memory, and other computing components. The controller 50 is communicatively coupled to the GNSS device 34, the swing sensor 33, and the IMUs 44, 46, 48. The controller 50 may be configured to determine the position of the teeth 30 of the bucket 20. This may include determining angles and rotations of the bodies 44, 46, 48, and determining coordinates of the center of rotation 14 and a heading of the excavator platform 11.

In some embodiments, the controller 50 may be configured to obtain an initial heading of the excavator platform 11 in the real-world coordinate frame. The initial heading may be obtained from an external source, or it may be obtained by any known technique such as obtaining position measurements using the GNSS device 34 while rotating the excavator platform 11 and determining the initial heading or obtaining position measurements using the GNSS device 34 while translating the excavator by tramming and determining the initial heading.

The controller 50 may determine coordinates of the center of rotation 14 of the excavator platform 11 using the initial heading, coordinates of a measurement center of the GNSS device 34, and the known spatial relationship between the measurement center of the GNSS device 34 and the center of rotation 14 of the excavator platform 11.

The controller 50 may also track rotation of the excavator platform 11 using rotation measurements from the swing sensor 33. Although rotation of the excavator platform 11 alone does not change a position of the center of rotation 14, tramming the excavator to a different location does change the position of the center of rotation 14. Using the rotation measurements from the swing sensor 33, the heading of the excavator platform 11 can be tracked during and after tramming. This allows the coordinates of the center of rotation 14 to be determined without obtaining heading information from sources other than the swing sensor 33 and without performing a heading initialization procedure after the tramming.

Figure 2A:
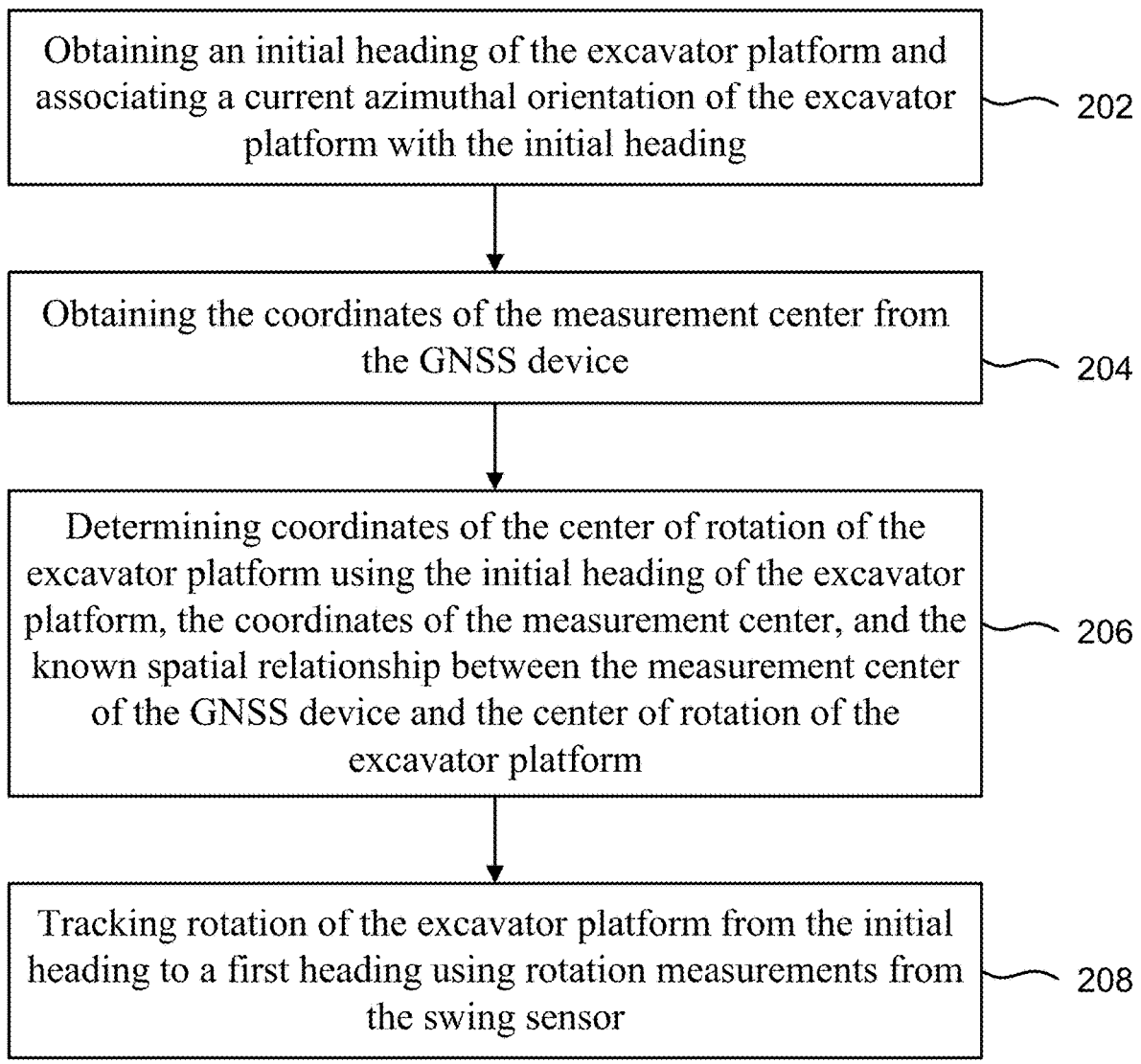
FIGS. 2A-2C are flowcharts illustrating exemplary methods for determining coordinates of a center of rotation of an excavator platform and tracking a heading of the excavator platform in accordance with some embodiments.
Figure 2B:
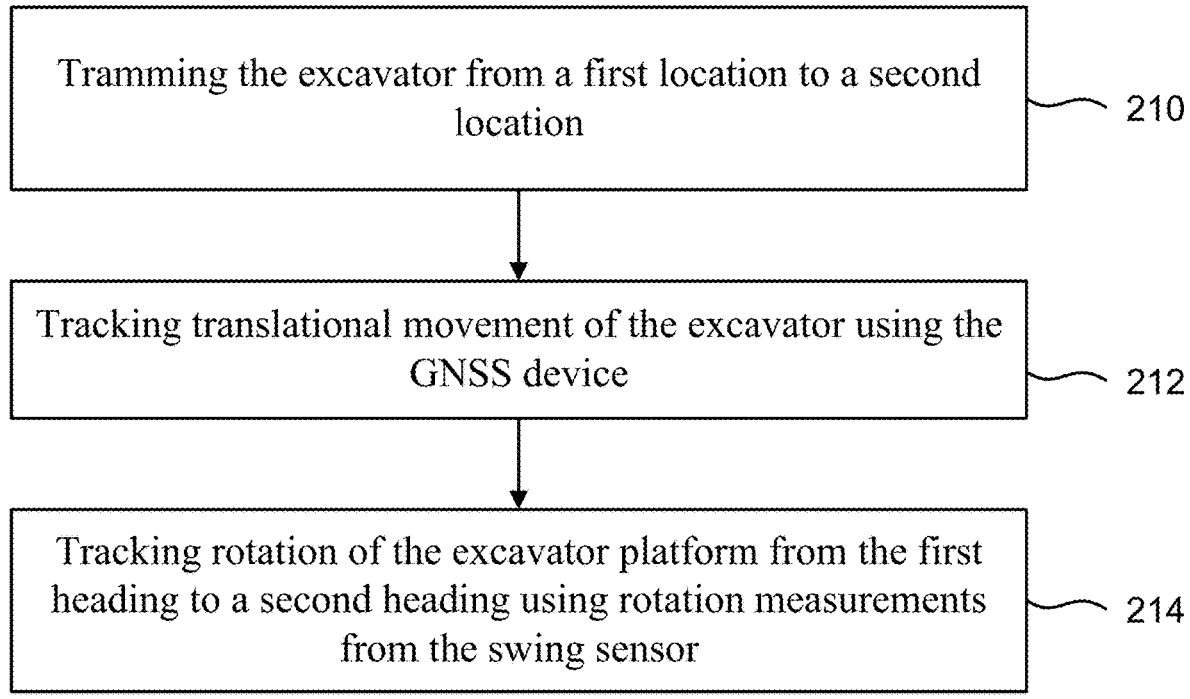
Figure 2C:
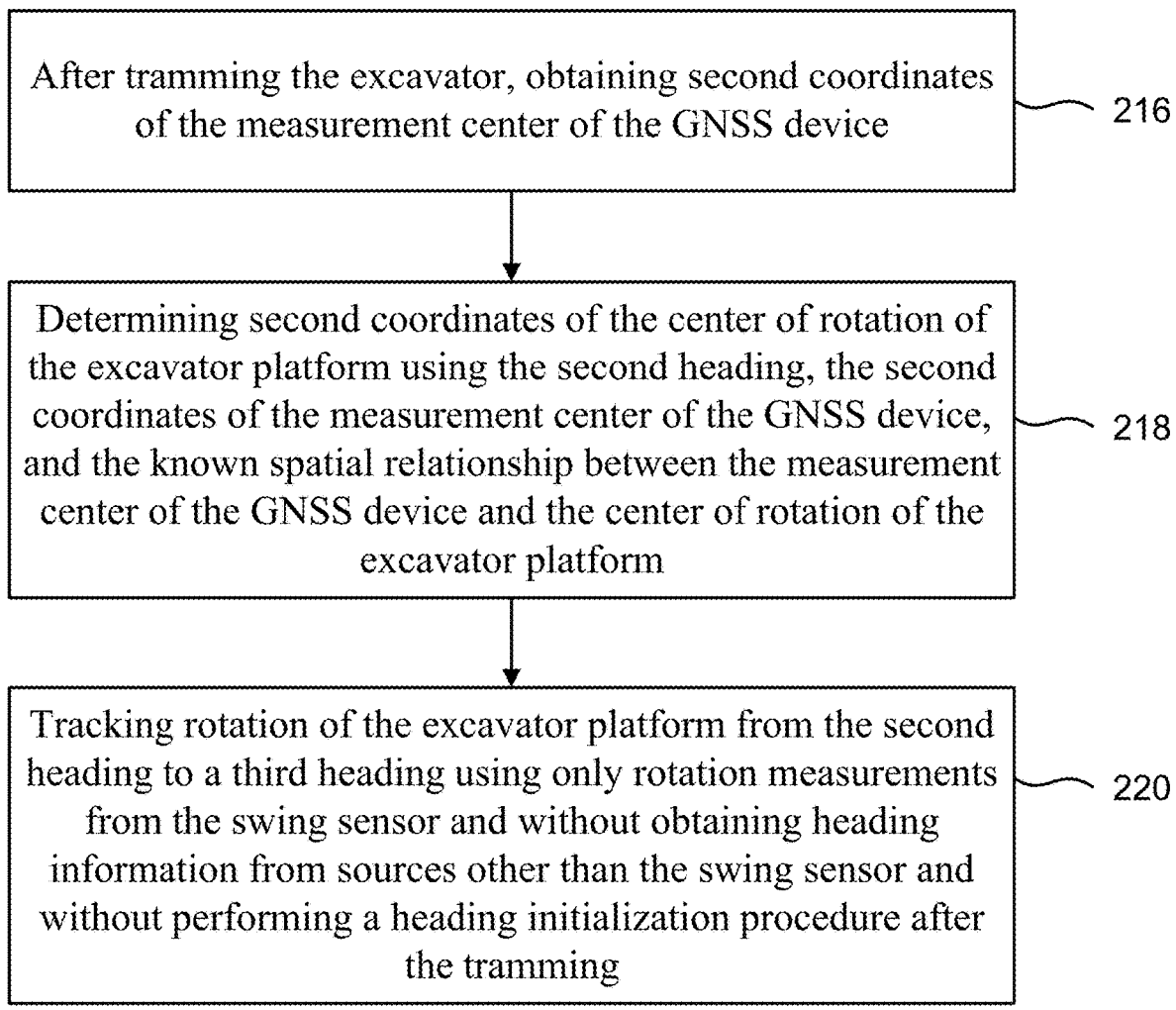

FIGS. 2A-2C are flowcharts illustrating exemplary methods for determining coordinates of a center of rotation of an excavator platform and tracking a heading of the excavator platform in accordance with some embodiments. The controller 50 in FIG. 1 may be configured to perform all or parts of the methods illustrated in these figures. The methods refer to excavator platforms but can be implemented in any system that includes an excavator platform coupled to an undercarriage and the appropriate sensors.

The method includes obtaining an initial heading of the excavator platform and associating a current azimuthal orientation of the excavator platform with the initial heading (202). The initial heading may be obtained by any known technique including obtaining position measurements from the GNSS device while rotating the excavator platform or while translating the excavator by tramming. This initial heading provides a reference for tracking of subsequent rotations using the swing sensor. The initial heading is generally with reference to the real-world coordinate frame.

The method also includes obtaining the coordinates of the measurement center from the GNSS device (204), and determining coordinates of the center of rotation of the excavator platform using the initial heading of the excavator platform, the coordinates of the measurement center, and the known spatial relationship between the measurement center of the GNSS device and the center of rotation of the excavator platform (206). When the initial heading is with reference to the real-world reference frame, the coordinates of the center of rotation may also be determined in the real-world coordinate frame.

In some embodiments, the method also includes tracking rotation of the excavator platform from the initial heading to a first heading using rotation measurements from the swing sensor (208). Once the initial heading is obtained, the swing sensor can provide direct rotation measurements of the excavator platform about the vertical axis of rotation from which heading of the excavator platform can be tracked.

In some embodiments, the method continues with the steps shown in FIG. 2B. The excavator may be trammed from a first location to a second location (210). The excavator may be trammed using the tracks or wheels of the undercarriage. While tramming, translational movement of the excavator is tracked using the GNSS device (212). Position measurements from the GNSS device may be obtained at a sampling rate that allows changes in position to be tracked.

If the excavator platform is rotated during tramming, the method may also include tracking rotation of the excavator platform from the first heading to a second heading using rotation measurements from the swing sensor (214). The swing sensor can provide direct rotation measurements during tramming.

In some embodiments, the method continues with the steps shown in FIG. 2C. After tramming the excavator, second coordinates of the measurement center of the GNSS device are obtained (216), and the second coordinates of the center of rotation of the excavator platform are determined using the second heading, the second coordinates of the measurement center of the GNSS device, and the known spatial relationship between the measurement center of the GNSS device and the center of rotation of the excavator platform (218).

In some embodiments, the method also includes, after tramming the excavator, tracking rotation of the excavator platform from the second heading to a third heading using only rotation measurements from the swing sensor and without obtaining heading information from sources other than the swing sensor and without performing a heading initialization procedure after the tramming (220). Because the swing sensor provide direct rotation measurements, the heading of the excavator can be tracked during and after tramming and does not have to be re-initialized after the center of rotation is moved.

It should be appreciated that the specific steps illustrated in FIGS. 2A-2C provide particular methods according to some embodiments. Other sequences of steps may also be performed according to alternative embodiments. For example, some embodiments may perform the steps outlined above in a different order. Moreover, some of the individual steps illustrated in FIGS. 2A-2C may be optional and/or may include multiple sub-steps that may be performed in various sequences. Furthermore, additional steps may be added or removed depending on the particular application.

Figure 3:
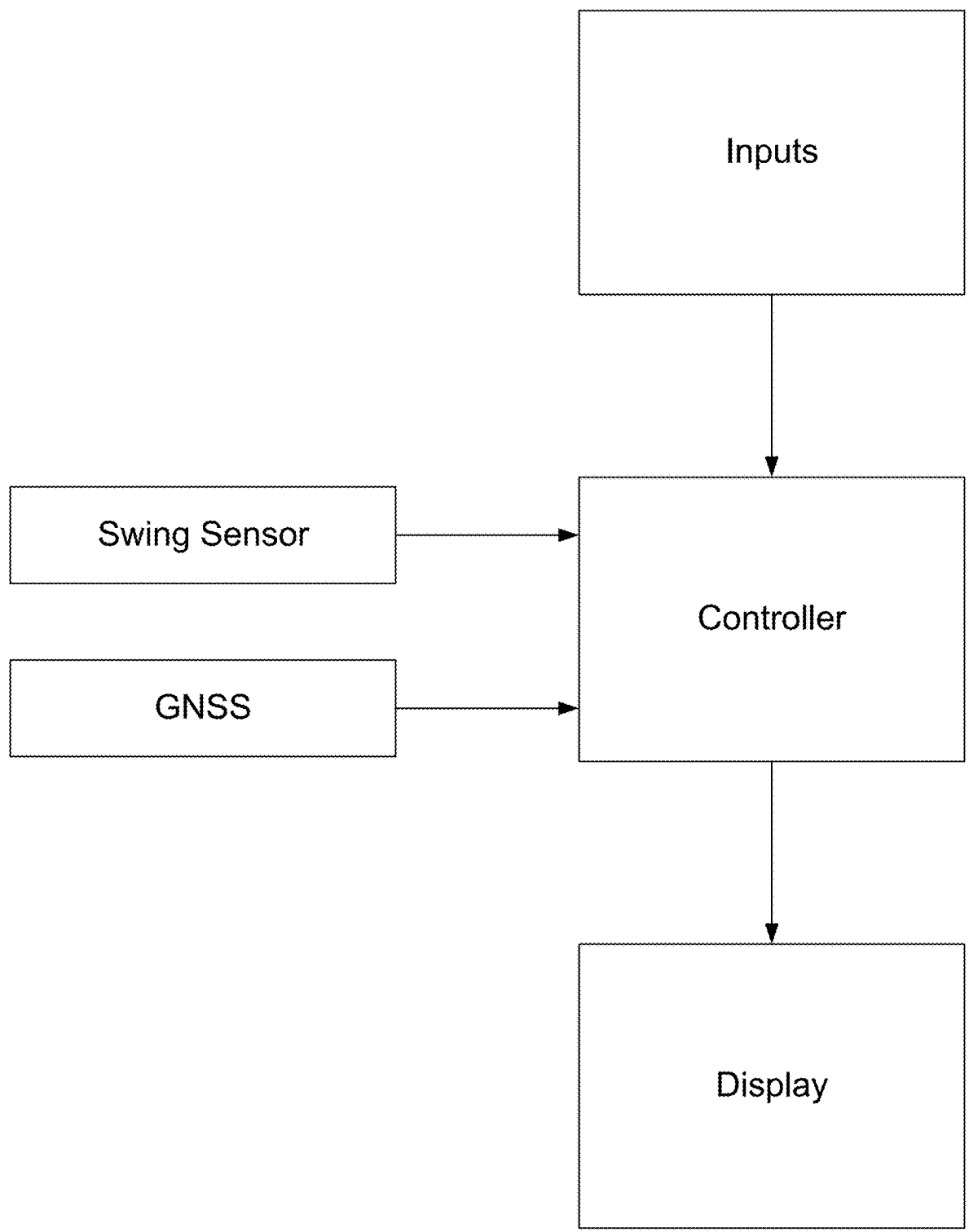
FIG. 3 is a simplified block diagram of an exemplary system for tracking a heading of an excavator in accordance with an embodiment.

FIG. 3 is a simplified block diagram of an exemplary system for tracking a heading of an excavator in accordance with an embodiment. The system includes a GNSS device, a swing sensor, and a controller. The GNSS device and the swing sensor may be communicatively coupled to the controller via wired or wireless communications. The controller may be configured to receive inputs from other sensors for determining a location of a working edge of an implement. The controller may also be wired or wirelessly coupled to a display for displaying location and heading information.

As explained previously, the GNSS device may have a measurement center disposed at a location away from a center of rotation of the platform and arranged in a known spatial relationship with the center of rotation. The GNSS device may be configured to determine positions of the excavator platform.

The swing sensor may be coupled to the excavator platform or the undercarriage at or proximate to a point of rotation between the excavator platform and the undercarriage. The swing sensor may be configured to perform rotation measurements of the excavator platform relative to the undercarriage.

The controller may be configured to perform any of the methods described herein. Some embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but with reference to the appended claims along with their full scope of equivalents.

What is claimed is:

1. A system for tracking rotation of a platform, comprising:
    the platform;
    an undercarriage coupled to the platform along a vertical axis aligned with a center of rotation of the platform, the platform configured to rotate around the vertical axis and the undercarriage configured to support the platform;
    a position measurement device coupled to the platform, the position measurement device having a measurement center located away from the vertical axis aligned with the center of rotation of the platform, the measurement center arranged in a known spatial relationship with the center of rotation of the platform, the position measurement device configured to determine coordinates of the measurement center in a real-world coordinate frame;
    a swing sensor coupled to the platform and configured to provide direct measurement at a point of rotation of the platform about the vertical axis aligned with the center of rotation;
    a controller communicatively coupled to the position measurement device and the swing sensor, the controller configured to:
        obtain an initial heading of the platform and associate a current azimuthal orientation of the platform with the initial heading;
        obtain the coordinates of the measurement center from the position measurement device;
        determine coordinates of the center of rotation of the platform using the initial heading of the platform, the coordinates of the measurement center, and the known spatial relationship between the measurement center of the position measurement device and the center of rotation of the platform; and
        track rotation of the platform from the initial heading to a first heading using rotation measurements from the swing sensor.

2. The system of claim 1 wherein the swing sensor is coupled to the platform or the undercarriage at a location proximate to a point of rotation between the platform and the undercarriage.

3. The system of claim 1 wherein the controller is configured to obtain the initial heading of the platform by obtaining a plurality of coordinates of the measurement center of the position measurement device while rotating the platform, and determine the initial heading of the platform using the plurality of coordinates.

4. The system of claim 1 wherein the controller is further configured to track translational movement of the platform during tramming using coordinate measurements from the position measurement device, and the controller is also configured to track rotation of the platform during tramming using rotation measurements from the swing sensor.

5. The system of claim 1 wherein the controller is further configured to determine second coordinates of the center of rotation of the platform after tramming the platform from a first location to a second location and after rotating the platform from the first heading to a second heading, the second coordinates of the center of rotation determined using coordinate measurements of the position measurement device at the second location and rotation measurements from the swing sensor during the rotation from the first heading to the second heading.

6. The system of claim 1 wherein the position measurement device includes a Global Navigation Satellite System (GNSS) device.

7. The system of claim 1 wherein the swing sensor is configured to measure the rotation of the platform by measuring an angular displacement of the platform about the vertical axis aligned with the center of rotation.

8. A method for tracking rotation of a platform using a position measurement device and a swing sensor, the method comprising:
    obtaining an initial heading of the platform and associating a current azimuthal orientation of the platform with the initial heading;
    obtaining first coordinates of a measurement center of the position measurement device, the measurement center of the position measurement device located away from a vertical axis aligned with a center of rotation of the platform, and the measurement center of the position measurement device arranged in a known spatial relationship with the center of rotation of the platform;
    determining first coordinates of the center of rotation of the platform using the initial heading of the platform, the first coordinates of the measurement center of the position measurement device, and the known spatial relationship between the measurement center of the position measurement device and the center of rotation of the platform; thereafter
    tracking rotation of the platform from the initial heading to a first heading using rotation measurements from the swing sensor, the swing sensor located at a point of rotation between the platform and an undercarriage of the platform, the swing sensor configured to measure rotation of the platform about a vertical axis aligned with the center of rotation; thereafter
    tramming the platform from a first location to a second location, and while tramming the platform:
        tracking translational movement of the platform using position measurements from the position measurement device; and
        tracking rotation of the platform from the first heading to a second heading using rotation measurements from the swing sensor;
    after tramming the platform:
        obtaining second coordinates of the measurement center of the position measurement device; and
        determining second coordinates of the center of rotation of the platform using the second heading, the second coordinates of the measurement center of the position measurement device, and the known spatial relationship between the measurement center of the position measurement device and the center of rotation of the platform.

9. The method of claim 8 wherein obtaining the initial heading of the platform includes obtaining a plurality of coordinates of the measurement center of the position measurement device while translating the platform, and determining the initial heading of the platform using the plurality of coordinates.

10. The method of claim 8 further comprising, after tramming the platform, tracking rotation of the platform from the second heading to a third heading using only rotation measurements from the swing sensor and without obtaining heading information from sources other than the swing sensor and without performing a heading initialization procedure after the tramming.

11. The method of claim 8 wherein the initial heading of the platform is provided in a real-world coordinate frame, and the second location of the platform is determined in the real-world coordinate frame.

12. The method of claim 8 wherein the known spatial relationship between the measurement center of the position measurement device and the center of rotation of the platform comprises a distance between the measurement center of the position measurement device and the center of rotation along at least one axis in a coordinate frame of the platform.

13. The method of claim 8 wherein the position measurement device includes a Global Navigation Satellite System (GNSS) device.

14. The method of claim 8 wherein the swing sensor is configured to measure the rotation of the platform by measuring an angular displacement of the platform about the center of rotation.

15. A method for tracking rotation of a platform using a position measurement device and a swing sensor, the method comprising:
obtaining a first heading of the platform and associating a current azimuthal orientation of the platform with the first heading;
obtaining first coordinates of a measurement center of the position measurement device, the measurement center of the position measurement device located away from a vertical axis aligned with a center of rotation of the platform, and the measurement center of the position measurement device arranged in a known spatial relationship with the center of rotation of the platform;
determining first coordinates of the center of rotation of the platform using the first heading of the platform, the first coordinates of the measurement center of the position measurement device, and the known spatial relationship between the measurement center of the position measurement device and the center of rotation of the platform; thereafter
tramming the platform from a first location to a second location, and while tramming the platform:
tracking translational movement of the platform using the position measurement device; and
tracking rotation of the platform from the first heading to a second heading using rotation measurements from the swing sensor, the swing sensor configured to provide direct measurement of rotation of the platform about the vertical axis aligned with the center of rotation;
after tramming the platform:
obtaining second coordinates of the measurement center of the position measurement device; and
determining second coordinates of the center of rotation of the platform using the second heading of the platform, the second coordinates of the measurement center of the position measurement device, and the known spatial relationship between the measurement center of the position measurement device and the center of rotation of the platform.

16. The method of claim 15 wherein the swing sensor is coupled to the platform or an undercarriage of the platform at a location proximate to a point of rotation between the platform and the undercarriage.

17. The method of claim 15 wherein obtaining the first heading of the platform includes obtaining a plurality of coordinates of the measurement center of the position measurement device while rotating the platform, and determining the first heading of the platform using the plurality of coordinates.

18. The method of claim 15 further comprising, after tramming the platform, tracking rotation of the platform from the second heading to a third heading using only rotation measurements from the swing sensor and without obtaining heading information from sources other than the swing sensor and without performing a heading initialization procedure after the tramming.

19. The method of claim 15 wherein the position measurement device includes a Global Navigation Satellite System (GNSS) device.

20. The method of claim 15 wherein the swing sensor is configured to measure the rotation of the platform by measuring an angular displacement of the platform about the vertical axis aligned with the center of rotation.

* * * * *